US007303147B1

(12) United States Patent
Danner et al.

(10) Patent No.: US 7,303,147 B1
(45) Date of Patent: Dec. 4, 2007

(54) SPRINKLER HAVING VALVE MODULE WITH RECIPROCATING VALVE SEAT

(75) Inventors: Fred M. Danner, Vista, CA (US); Jeff M. Smith, Vista, CA (US)

(73) Assignee: Hunter Industries, Inc., San Marcos, CA (US)

( * ) Notice: Subject to any disclaimer, the term of this patent is extended or adjusted under 35 U.S.C. 154(b) by 31 days.

(21) Appl. No.: 11/364,434

(22) Filed: Feb. 28, 2006

(51) Int. Cl.

| | |
|---|---|
| ***B05B 15/10*** | (2006.01) |
| ***B05B 15/06*** | (2006.01) |
| ***B05B 3/04*** | (2006.01) |
| ***F16K 31/12*** | (2006.01) |
| ***F16K 25/00*** | (2006.01) |

(52) U.S. Cl. ...................... 239/203; 239/201; 239/237; 239/240; 251/26; 251/170

(58) Field of Classification Search ................ 239/203, 239/201, 237, 240, 200, 204, 205, 206, 225.1, 239/242, 456, 569, 575, DIG. 1; 251/26, 251/170

See application file for complete search history.

(56) References Cited

U.S. PATENT DOCUMENTS

| | | | | |
|---|---|---|---|---|
| 2,833,299 | A * | 5/1958 | Marriette | 137/221 |
| 4,637,548 | A * | 1/1987 | Ray et al. | 239/201 |
| 5,871,156 | A | 2/1999 | Lawson | 239/201 |
| 5,899,386 | A * | 5/1999 | Miyasato et al. | 239/289 |
| 5,927,607 | A * | 7/1999 | Scott | 239/205 |
| 6,186,413 | B1 * | 2/2001 | Lawson | 239/205 |
| 6,491,235 | B1 | 12/2002 | Scott et al. | 239/208 |
| 6,854,664 | B2 * | 2/2005 | Smith | 239/205 |

* cited by examiner

*Primary Examiner*—Darren Gorman
(74) *Attorney, Agent, or Firm*—Michael H. Jester

(57) ABSTRACT

A sprinkler includes an outer case and a riser mounted for reciprocation within the case. The riser supports a nozzle, an impeller, and a drive linkage connecting the nozzle and the impeller. A diaphragm valve is mounted in outer case beneath the riser and includes a valve member vertically reciprocable within a valve support housing to engage and disengage a valve seat. The valve seat can reciprocate relative to the valve support housing to reduce mechanical loading.

13 Claims, 6 Drawing Sheets

SPRINKLER HAVING VALVE MODULE WITH RECIPROCATING VALVE SEAT

FIELD OF THE INVENTION

The present invention relates to sprinklers used to irrigate lawns, gardens and landscaping, and more particularly, to so-called valve-in-head sprinklers that have built in valves for turning ON and OFF the application of water by the sprinkler.

BACKGROUND

Irrigation systems used in homes typically comprise a garage-mounted electronic controller that selectively turns a plurality of solenoid actuated valves ON and OFF in accordance with a pre-programmed watering schedule. The valves admit water to subterranean PVC pipes having several spray, rotor-type or drip-type sprinklers attached to the pipes at spaced intervals. The solenoid actuated valves are usually housed together in a plastic valve box buried near the electronic controller.

In some environments, such as golf courses, so called "valve-in-head" sprinklers are preferred. They have a diaphragm valve built into the lower end thereof which is typically actuated by a solenoid mounted in the sprinkler itself that opens and closes a pilot valve. Each valve-in-head sprinkler on a golf course can thus be individually actuated by an electronic controller usually mounted a considerable distance away.

In U.S. Pat. No. 6,491,235 of Scott et al., assigned to Hunter Industries, Inc., there is disclosed a valve-in-head sprinkler that has a top serviceable diaphragm module. The diaphragm valve module can be readily replaced without excavation and removal of the entire sprinkler if the diaphragm valve module is worn, damaged by grit or otherwise defective, e.g. if there is leakage from the top of the outer sprinkler case when the valve is in its OFF state. The telescoping riser that contains the nozzle, turbine and gear drive train is first removed from the outer sprinkler case. The diaphragm valve module, which is mounted in the lower end of the outer sprinkler case, can then be withdrawn and replaced.

Valve-in-head sprinklers typically operate at a relatively high pressures, e.g. over one hundred PSI, and in some cases as high as two hundred PSI. When the valve is in its CLOSED or turbine state such high water pressures place substantial strains on the mechanical components which can lead to failures. It would be desirable to have an improved replaceable valve module for a valve-in-head sprinkler that alleviates this problem.

SUMMARY OF THE INVENTION

In accordance with an embodiment of the invention, a sprinkler includes an outer case and a riser mounted for reciprocation within the case. The riser supports a nozzle, an impeller, and a drive linkage connecting the nozzle and the impeller. A diaphragm valve is mounted in outer case beneath the riser and includes a valve member vertically reciprocable within a valve support housing to engage and disengage a valve seat. The valve seat can reciprocate relative to the valve support housing.

In accordance with another embodiment of the invention a valve module for a sprinkler includes a valve support housing including a cap portion. A valve seat is connected to the valve support housing for reciprocation toward and away from the valve support housing. A valve member is reciprocable within the support housing to engage and disengage the valve seat. A diaphragm is mounted in the valve support housing and has an outer periphery connected to the valve support housing and an inner periphery connected to the valve member. A pilot hole passage is provided for venting fluid from a chamber between the diaphragm and the cap portion to permit the valve member to move between a CLOSED position in which the valve member is engaged with the valve seat and an OPEN position in which the valve member is disengaged with the valve seat.

DETAILED DESCRIPTION

Figure 1:
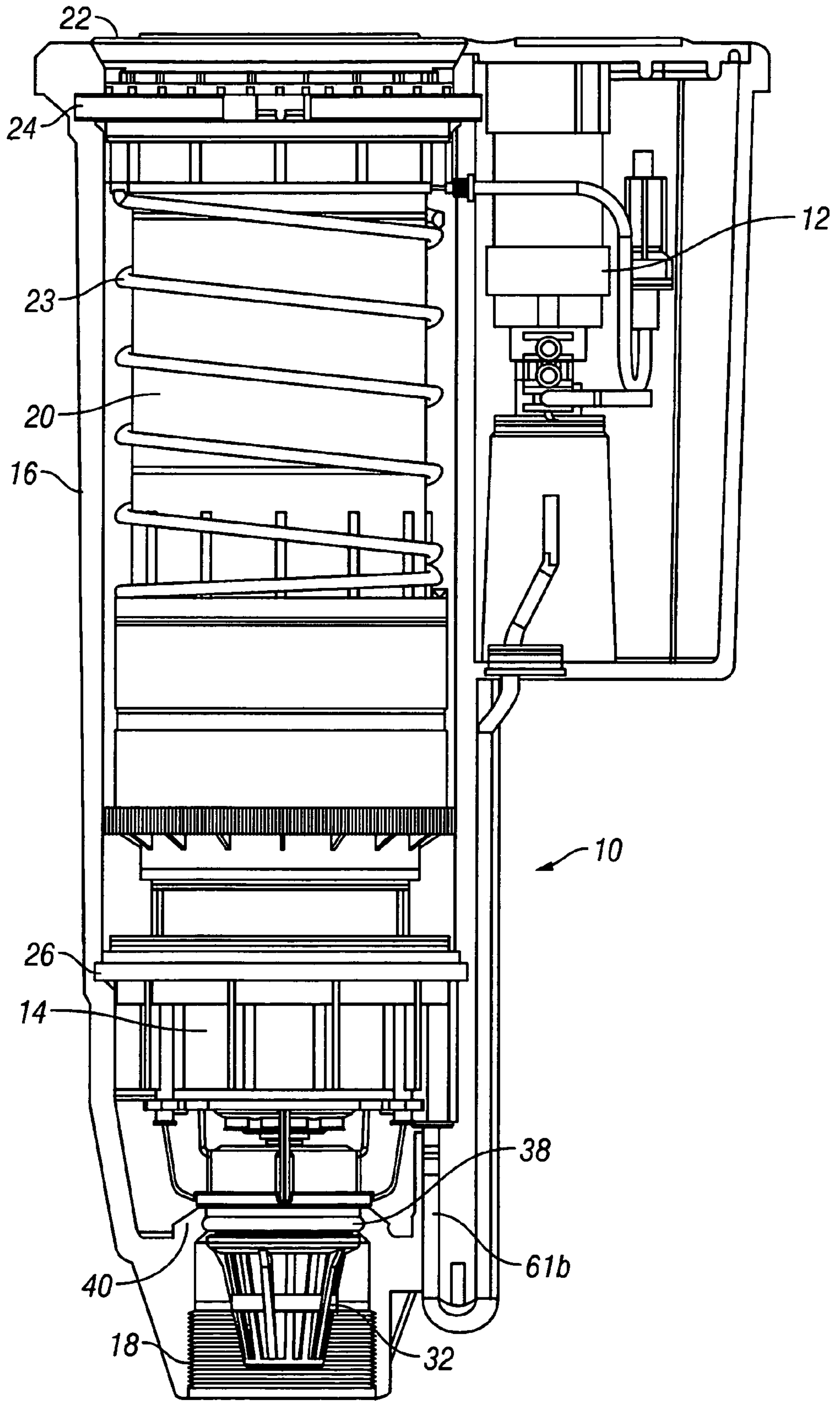
FIG. 1 is a part vertical section, part side elevation view of a valve-in-head sprinkler with a replaceable valve module in accordance with an embodiment of the present invention.
Figure 2:
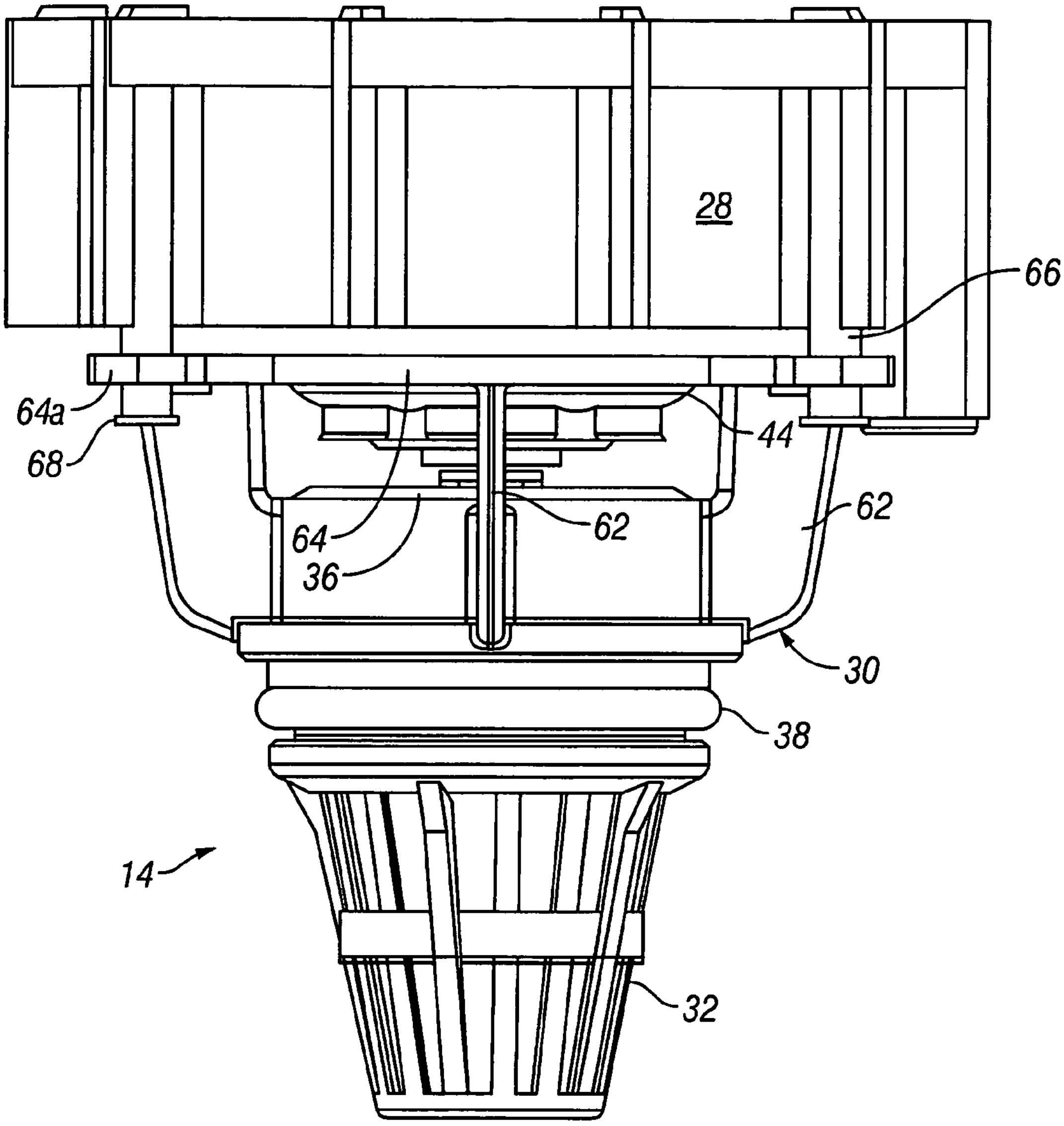
FIG. 2 is an enlarged side elevation view of the valve module of the sprinkler of FIG. 1 illustrating its valve in an OPEN state.
Figure 3:
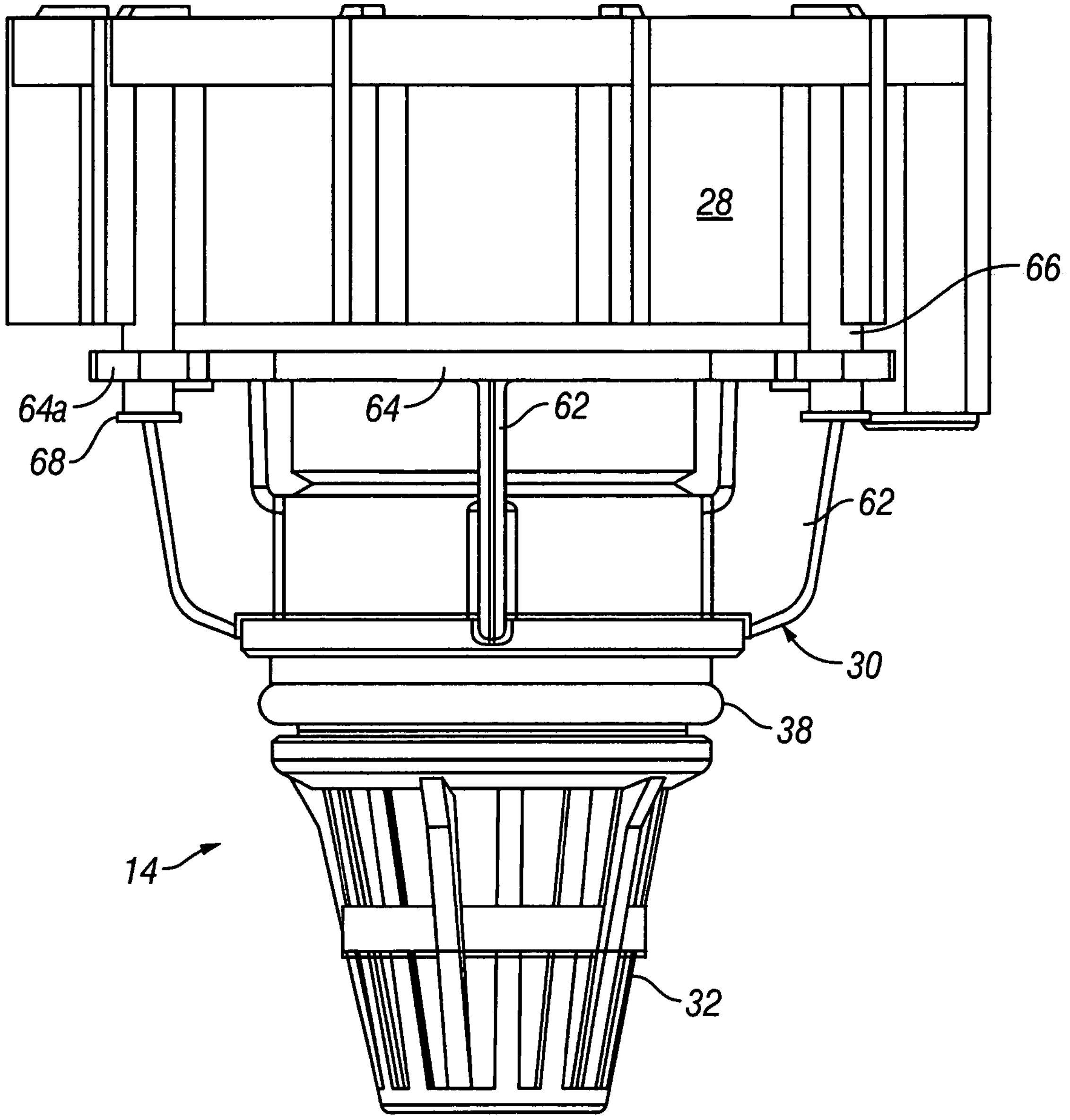
FIG. 3 is an enlarged side elevation view of the valve module of the sprinkler of FIG. 1 illustrating its valve in an CLOSED state.

The entire disclosure of U.S. Pat. No. 6,491,235 granted Dec. 10, 2002 to Scott et al. is hereby incorporated by reference. Referring to FIG. 1, a valve-in-head rotor type sprinkler 10 includes a valve actuator component assembly 12 and a top serviceable diaphragm valve module 14. The valve module 14 is mounted in the lower end of a generally cylindrical outer case 16 having a female threaded inlet 18. A tubular riser 20 is vertically reciprocable within the outer case 16 when the valve module 12 is opened and closed. A cylindrical nozzle head or turret 22 is rotatably mounted at the upper end of the riser 20. The riser 20 is held in its retracted position by a coil spring 23 held in place by an upper snap ring 24. A turbine (or other impeller such as a ball drive), gear reduction, and reversing mechanism (not visible) are mounted in the riser 20 and rotate the nozzle turret 22 through an adjustable arc, as well known in the art. A lower snap ring 26 releasably holds the valve module 20 in position within the lower end of the outer case 16.

FIGS. 2-6 illustrate details of the valve module 14. The valve module 14 includes a generally cylindrical upper valve support housing 28 and a lower valve seat support basket 30 connected to the underside of the upper valve support housing 28. The valve seat support basket 30 is formed with a frusto-conical filter screen 32 at its lower end. A cylindrical upper section 34 of the valve support basket 30 has an upper end that forms a valve seat 36. An O-ring 38 made of suitable elastomeric material provides a seal between the valve seat support basket 30 and a shoulder 40 (FIG. 1) of the outer case 16.

A cylindrical piston valve member 42 is vertically reciprocable within the support housing 28. A horizontally extending valve disk member 44 made of suitable elastomeric material extends across the lower end of the piston valve member 42 and its peripheral edge is moved into and out of sealing engagement with the valve seat 36. The piston valve member 42 slides up and down through a circular aperture in a guide member 46. The outer periphery of a flexible elastomeric diaphragm 48 is locked between the guide member 46 and a generally dome-shaped cap portion 50 of the valve support housing 28. The inner periphery of the diaphragm 48 is locked between the inner and outer sections of the piston valve member 42. A coil spring 52 is captured between the center of the cap portion 50 and the bottom of the inner section of the piston valve member 42 to bias the piston valve member to its lower CLOSED position illustrated in FIG. 5. A metering pin 54 extends through a metering plate assembly 56 attached to the underside of the piston valve member 42, overlying the valve disk member 44. The metering pin 54 extends axially through the center of the piston valve member 42 and its upper end is captured in a socket 58 formed in the underside of the center of the cap portion 50. All of the components of the diaphragm valve module 14 are removable as unit from the upper end of the outer case 16 upon removal of the riser 20 which requires removal of the snap rings 24 and 26.

Figure 5:
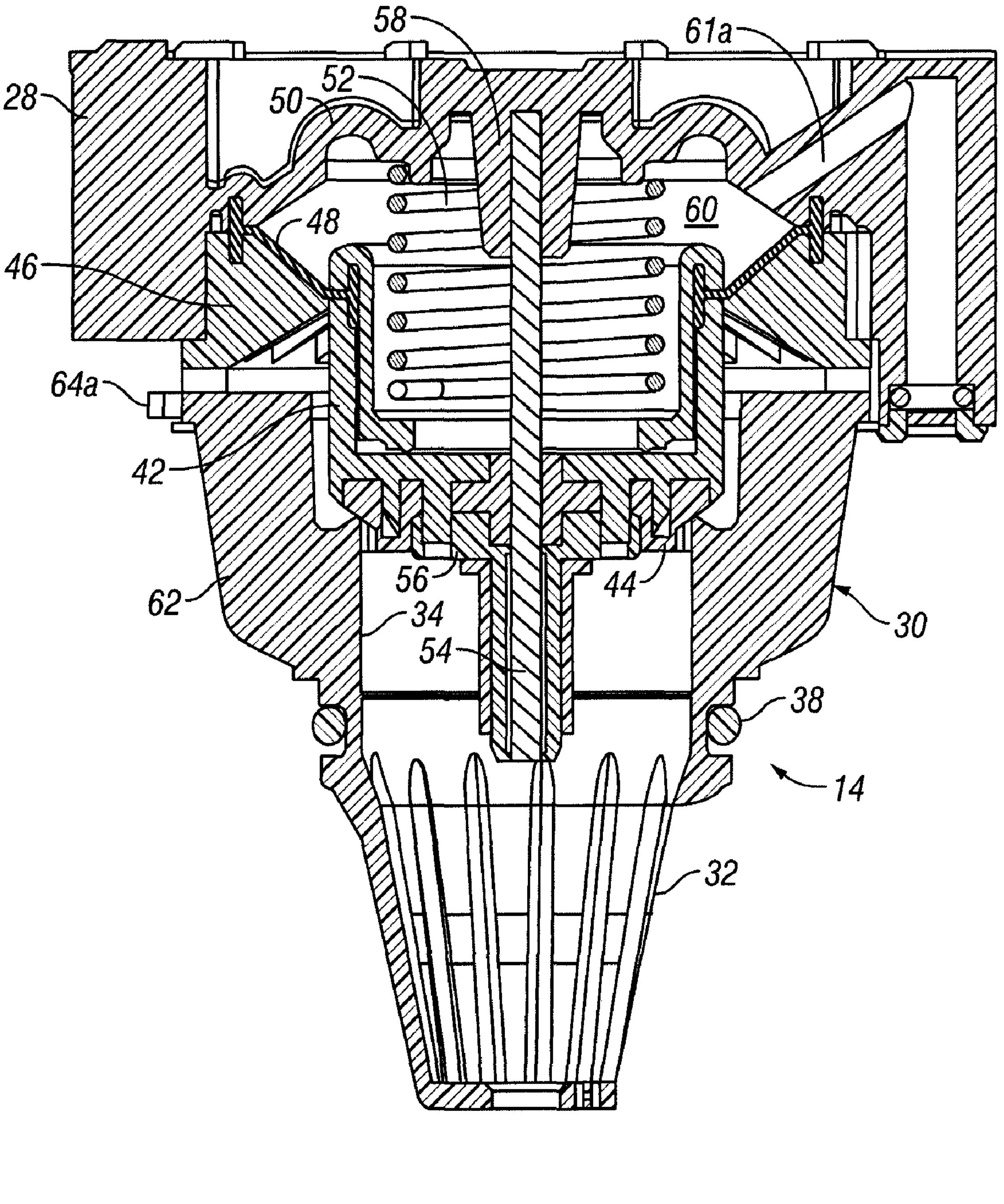
FIG. 5 is a vertical sectional similar to FIG. 4 illustrating the valve of the module in a CLOSED state.
Figure 6:
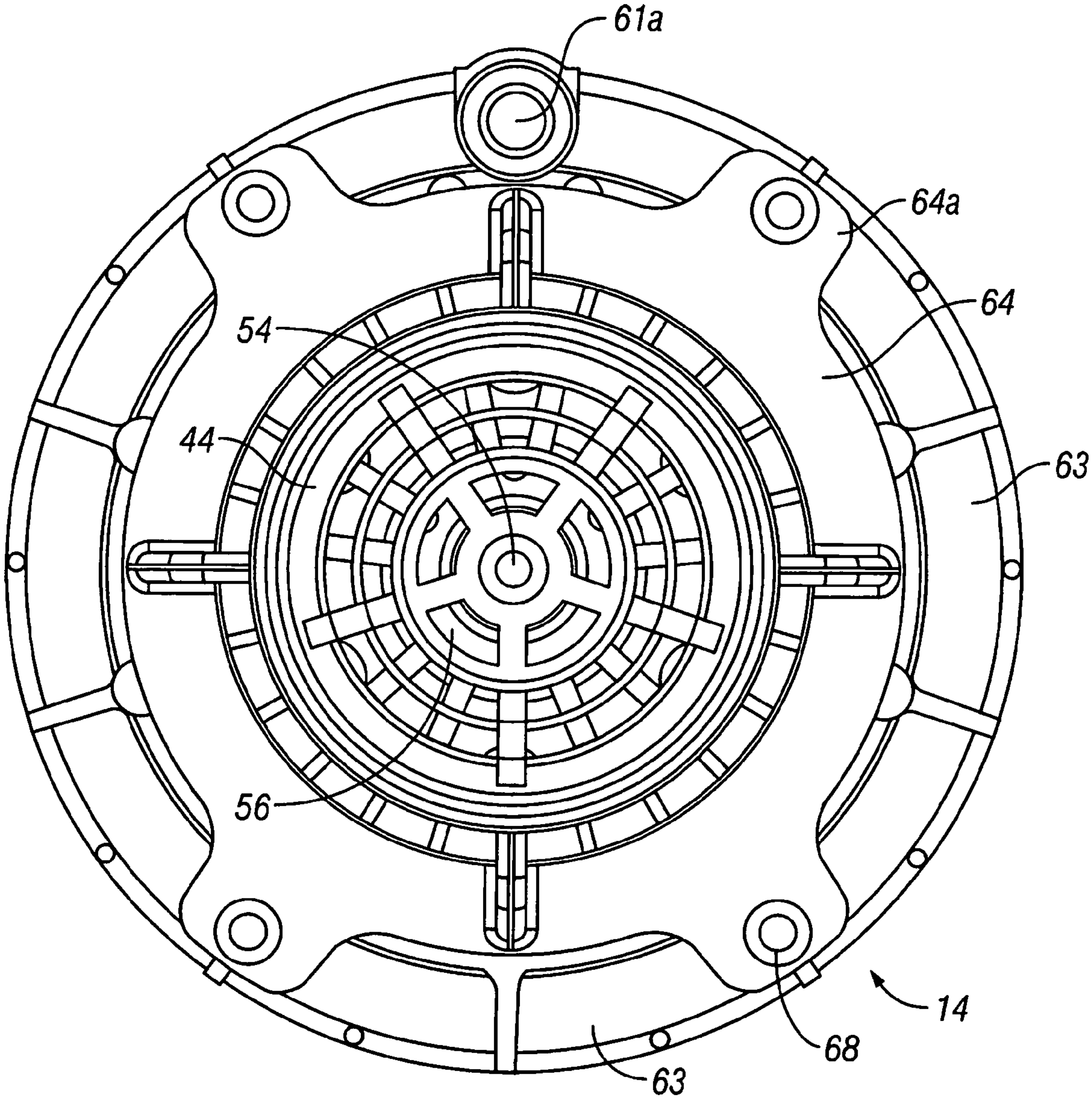
FIG. 6 is an enlarged bottom plan view of valve module of the sprinkler of FIG. 1.

The valve actuator component assembly 12 (FIG. 1) can be actuated to vent water from the chamber 60 (FIG. 5) between the upper side of the diaphragm 48 and the cap portion 50 through a pilot hole passage 61*a* (FIG. 4) connected via tube 61*b* (FIG. 1). The piston valve member 42 then moves from its lower CLOSED position illustrated in FIG. 5 to its upper OPEN position illustrated in FIG. 4. This disengages the valve disk member 44 from the valve seat 36 allowing water to flow through the inlet 18, through the filter screen 32 and out of the valve support basket 30. When the water leaves the valve seat support basket 30 it flows between four circumferentially spaced (ninety degrees apart) vertically extending ribs 62 of the valve seat support basket 30 and through a plurality of circumferentially spaced flow passages 63 (FIG. 6). This water then flows into the open lower end of the riser 20 and exits from the nozzle turret 22 in an inclined stream.

Figure 4:
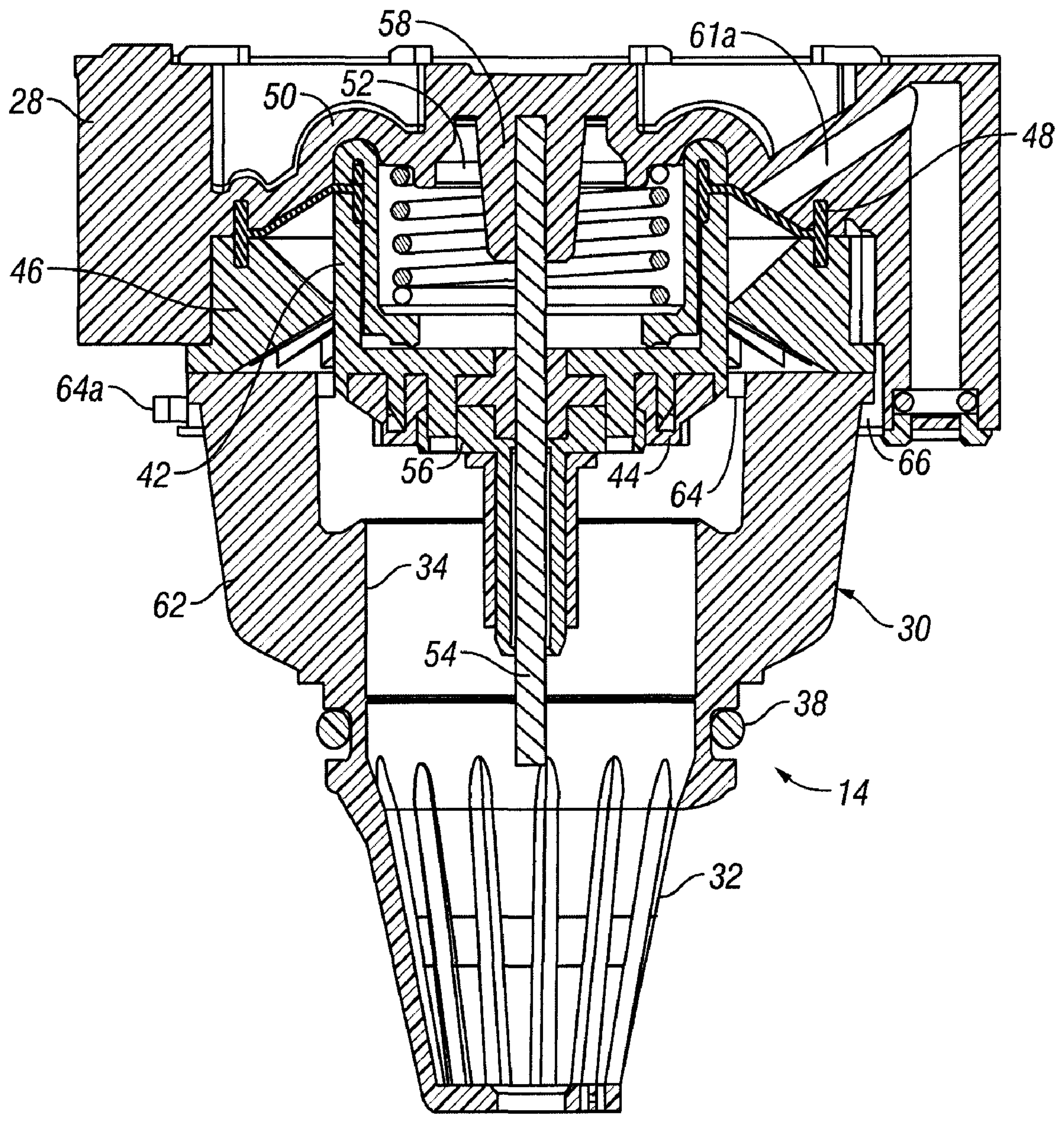
FIG. 4 is an enlarged vertical sectional view of the valve module of the sprinkler of FIG. 1 illustrating its valve in an OPEN state.

The valve seat support basket 30 (FIGS. 2-5) is loosely connected to the valve support housing 28 so that the valve seat 36 can reciprocate vertically relative to the valve support housing 28. By way of example only, the amount of reciprocation of the valve seat support basket 30 may be less than five millimeters. This greatly reduces the mechanical stress and loading on the ribs 62 and other components of the diaphragm valve module 14 when the diaphragm valve module 14 is in its closed or OFF state illustrated in FIGS. 3 and 5. The valve seat support basket 30 is connected to the upper valve support housing 28 by a retaining ring 64 (FIG. 6) with four flanges 64*a* having apertures that slide vertically over four circumferentially spaced vertical retaining posts 66. The retaining posts 66 vertically extend from the underside of the valve support housing 28. FIG. 4 illustrates the slightly raised position of the valve seat support basket 30 when the diaphragm valve module 14 is in its OPEN state. FIG. 5 illustrates the slightly lowered position of the valve seat support basket 30 when the diaphragm valve module 14 is in its CLOSED state. The lower ends of the retaining posts 66 are swaged to provide a flare 68 (FIGS. 2 and 6) to keep the retaining ring 64 from becoming detached from the valve support housing 28.

The four retaining posts 66 retain the valve support basket 30 in a manner such that the valve support basket 30 is not under spring tension when the diaphragm valve module 14 is not yet installed in the outer case 16. This prevents stress on the ribs 62, retaining ring 64 and retaining posts 66. The valve seat 36 is capable of independent movement relative to the valve support housing 28 so that the closing forces generated by the piston valve member 42 do not apply unwanted loading on the various components of the valve support basket 30 under relatively high water pressures, e.g. over one hundred PSI. When the diaphragm valve module 14 goes to its CLOSED state, the valve support basket 30 is forced downwardly until it stops against the upper end of shoulder 40 (FIG. 1). The valve support housing 28 in turn moves upwardly until it stops against the underside of lower snap ring 26. The top of the valve support housing has projections (not visible) that lock the lower snap ring 26, providing a safety feature to prevent unsafe removal of the lower snap ring 26 when the sprinkler 10 is pressurized. The ability of the valve support basket 30 to reciprocate downwardly when the pressurized water to the sprinkler 10 is turned OFF allows the lower snap ring to be unlocked and removed.

While we have described an embodiment of the present invention, it should be understood that the sprinkler and diaphragm valve module can be modified in both arrangement and detail. For example, our invention can implemented in a valve-in-head sprinkler that does not have a removable diaphragm valve module. Therefore, the protection afforded our invention should only be limited in accordance with the scope of the following claims.

We claim:

1. A sprinkler, comprising:

an outer case;

a riser mounted for reciprocation within the case and including a nozzle, an impeller, and a drive linkage connecting the nozzle and the impeller; and a diaphragm valve mounted in the outer case beneath the riser including a valve member vertically reciprocable within a valve support housing to engage and disengage a valve seat that can reciprocate relative to the valve support housing, the valve support housing, valve member and valve seat being removable as unit from an upper end of the outer case upon removal of the riser.

2. The sprinkler of claim 1 and further comprising a filter screen attached to the valve seat.

3. The sprinkler of claim 1 wherein the valve seat is connected to the valve support housing by a retaining ring that slides over plurality of retaining posts that extend from the valve support housing.

4. The sprinkler of claim 3 wherein the retaining ring is connected to the valve seat by a plurality of ribs.

5. The sprinkler of claim 1 wherein the valve seat is formed as part of a support basket and an elastomeric seal member surrounds a lower portion of the support basket.

6. The sprinkler of claim 1 and further comprising a spring mounted inside the valve support housing for biasing the valve member toward a CLOSED position.

7. The sprinkler of claim 1 wherein the valve member is a piston valve member.

8. The sprinkler of claim 1 wherein the diaphragm valve further includes a cap portion and a metering pin extending through the valve member and having an upper end seated in the cap portion.

9. The sprinkler of claim 1 and further comprising a valve actuator component assembly operatively connected to the diaphragm valve.

10. A valve-in-head sprinkler, comprising:

an outer case;

a riser vertically reciprocable inside the outer case through an opening in an upper end of the outer case;

a diaphragm valve mounted in the outer case and including a valve seat that is vertically slidable within a predetermined limited range relative to a valve support housing to reduce mechanical loading on a structure connecting the valve seat to the valve support housing.

11. A sprinkler, comprising:

an outer case;

a riser mounted for reciprocation within the case and including a nozzle, an impeller, and a drive linkage connecting the nozzle and the impeller; and a diaphragm valve mounted in the outer case beneath the riser including a valve member vertically reciprocable within a valve support housing to engage and disengage a valve seat that can reciprocate relative to the valve support housing, the valve seat being connected to the valve support housing by a retaining ring that slides over plurality of retaining posts that extend from the valve support housing.

12. A valve-in-head sprinkler, comprising:

an outer case;

a riser vertically reciprocable inside the outer case through an opening in an upper end of the outer case;

a nozzle head rotatably mounted at the upper end of the riser;

a turbine, a gear reduction and a reversing mechanism mounted in the riser coupled for rotating the nozzle head through an adjustable arc;

a valve mounted in the outer case beneath the riser and including a valve seat that is loosely connected to a valve support housing so that the valve seat can vertically reciprocate within a predetermined limited range relative to the support housing in order to reduce mechanical loading on a structure connecting the valve seat to the valve support housing.

13. A valve-in-head sprinkler, comprising:

an outer case;

a riser mounted for vertical reciprocation within the case;

a nozzle rotatably mounted at the upper end of the riser;

a drive mechanism within the riser for rotating the nozzle; and a valve mounted in the outer case beneath the riser including a valve seat slidable to reduce mechanical loading on a structure connecting the valve seat to a support portion of the valve.

* * * * *